Dec. 27, 1938.    R. L. LEVY    2,141,541
HYDRAULIC DAMPING DEVICE
Filed Oct. 18, 1935

R. L. Levy
INVENTOR
By Glascock Downing Seebold
Attys.

Patented Dec. 27, 1938

2,141,541

UNITED STATES PATENT OFFICE 2,141,541

HYDRAULIC DAMPING DEVICE

René Lucien Levy, Montrouge, France, assignor to Société d'Inventions Aeronautiques et Mécaniques S. I. A. M., Fribourg, Switzerland Application October 18, 1935, Serial No. 45,658
In France December 22, 1934

7 Claims. (Cl. 267—64)

In devices adapted to hydraulically dampen or deaden certain phenomena,—for instance devices used in the suspension of vehicles, such as shock absorbers, and the function of which is to dampen or deaden the displacements of movable members in two opposed directions, which devices can be associated or not with a resilient system (utilizing compressed air, springs, rubber, or any other means),—it is important that the liquid should always act under compression stress.

In fact, in the reverse case, between the liquid and the movable member, for instance the piston of the damping device, shocks, water-hammering, or vibrations can occur, which effects are prejudicious to the proper operation of the damping device.

The present invention resides in a hydraulic device capable of operating as damping device in two opposed directions and in which the liquid always acts under compression stress, this device being characterized by the combination of two chambers, of variable capacity, so arranged that, when the movable member of the damping device moves according to one of these directions, one chamber alone exerts the damping effect, whilst the other chamber fills up, through a connection not offering an appreciable resistance to the discharge of the liquid, in communication, for instance, with a tank common to both chambers, the function of these two chambers being automatically reversed when said member moves in the opposite direction.

Another object of the invention is to provide a hydraulic damping device presenting these features and in which the two chambers are each provided with two series of openings, one series, constantly open and of small cross section, serving to exert on the liquid a damping and checking action, the other series, being provided with members allowing the circulation of the liquid in one direction only, but then ensuring the rapid filling up of these chambers alternately.

The invention is illustrated, by way of example only, in the accompanying drawing, in which.

Figure 1:
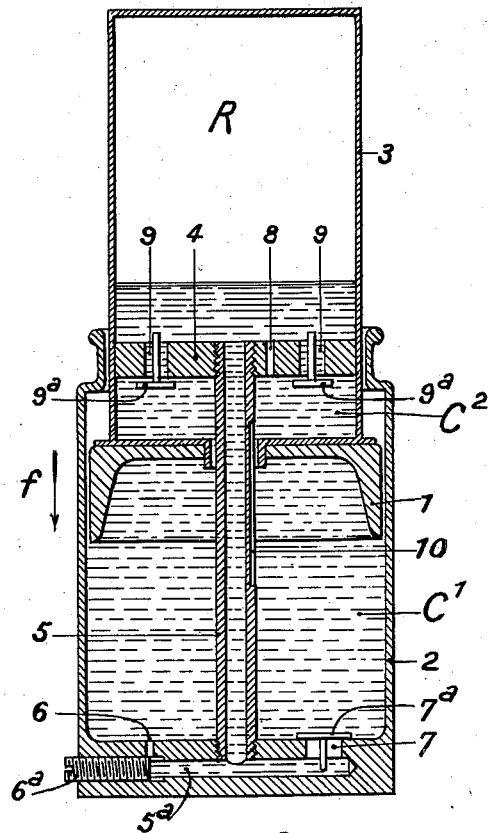
Fig. 1 shows the application of the invention in the case of horizontal cylinders and in combination with pneumatic suspension means.

Referring to Fig. 1, it will be seen that the chamber $C^1$ is comprised between a piston 1, movable in a cylinder 2, and the bottom of the latter.

The chamber $C^2$ is formed within a cylinder 3 constituted by the hollow rod of the piston 1. It is limited, on one side, by the upper face of this piston and, on the other side, by a fixed diaphragm 4. This diaphragm is rigid with a hollow rod 5, secured to the bottom of the cylinder 2 and opening in a conduit $5^a$, which can communicate with chamber $C^1$, either through a restricted orifice 6 provided with an adjustable throttle member $6^a$, or through an orifice 7, of large cross section, provided with a valve $7^a$ opening within chamber $C^1$.

The rod 5 opens, at its upper part, above the diaphragm 4, in a chamber R, formed by the hollow rod 3 of the piston. This chamber contains a gas under pressure which exerts a resilient action, for example, for the suspension of a vehicle.

The diaphragm, limiting the chamber $C^2$, is provided with orifices 8 of restricted cross section, and with orifices 9 of large cross section, and these latter can be obturated by valves $9^a$, only opening inwardly of chamber $C^2$.

Finally, longitudinal grooves 10 can be provided on the periphery of the hollow rod 5, so as to allow a circulation of the liquid between chambers $C^1$ and $C^2$, through a passageway of very narrow cross section.

The device is filled with liquid up to above the diaphragm 4, as indicated in Fig. 1.

The operation is as follows:

When the piston 1 moves in the cylinder 2 according to the direction of the arrow $f$, the valve $7^a$ is pressed upon its seat, so that the liquid compressed in $C^1$ can escape only through the narrow orifice 6, from which, through conduits $5^a$ and 5, it returns above the diaphragm in the reserve of liquid contained in the movable tank R.

The damping or deadening effect then takes place in chamber $C^1$ at the narrow orifice 6. During this time, chamber $C^2$ does not fulfill any damping function: it increases in volume, but it instantaneously fills up owing to the opening of valves $9^a$—$9^a$, uncovering the orifices of large cross section and allowing the liquid from tank R to enter this chamber.

It will easily be understood that, when the movement of the piston 1 takes place in the direction opposed to that indicated by arrow $f$, the damping effect occurs in chamber $C^2$ through the medium of the narrow orifices 8 of the diaphragm, while chamber $C^1$, the volume of which increases, instantaneously fills up through the orifice 7 of large cross section, the valve $7^a$ of which opens.

The grooves 10, extending on a certain length of rod 5, allow, during a portion of the stroke of the piston, of offering a supplementary passageway for the circulation of the liquid between chambers $C^1$ and $C^2$, in one direction or the other.

It will be seen that, owing to this device, while one of the chambers $C^1$ and $C^2$ operates under compression stress, the other chamber receives liquid through a channel of large cross section, so that no unseating effect and no cavitation can take place.

It will be noted that the lifting of the valves $7^a$—$9^a$ does not necessitate any effort capable of slackening the afflux of the liquid through the openings of large cross section.

Figure 2:
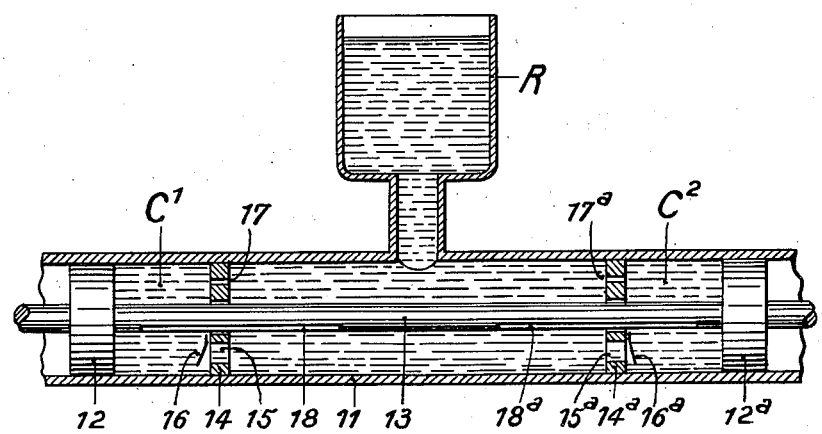
Fig. 2 illustrates the application of the invention in the case of horizontal cylinders, without suspension.

The same results are obtained by a device based on the same principle in the case of horizontal cylinders as illustrated in Fig. 2.

In a horizontal cylinder 11, can slide two pistons 12—12$^a$ connected by a rod 13.

Two diaphragms 14—14$^a$, secured in the cylinder and allowing the rod 13 to pass, are each provided with a large opening 15—15$^a$, which can be closed by valves 16—16$^a$, which open inwardly of chambers $C^1$—$C^2$, comprised between each of the pistons and the most adjacent diaphragm. Openings 17—17$^a$, of small cross section, are also provided in the diaphragm.

The portion of the cylinder comprised between the diaphragms is in permanent communication with a tank R containing liquid, so that the space comprised between the pistons is filled with liquid.

Grooves 18—18$^a$ can be longitudinally provided on a certain length of the rod 13, where it passes through the diaphragms.

The operation of this device takes place in conditions similar to those which have been described above with reference to Fig. 1.

In all cases, such damping systems are independent of the expansions of the liquid.

What I claim as my invention and desire to secure by Letters Patent is:—

1. A hydraulic damping device comprising a first vertical cylinder, a piston movable in the said first cylinder, a first hollow rod rigid with the said piston having its free end closed and forming a second cylinder, a cover or head for the first cylinder, a second hollow rod secured to the said cover or head, a diaphragm rigid with the said second hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said orifice, a restricted orifice having a constant sectional area and formed in the said diaphragm and establishing communication between the two chambers on both sides of said diaphragm, an orifice of large sectional area formed in the said diaphragm and establishing communication between the chambers on both sides of the diaphragm, a valve opening in one direction only relative to said last named orifice, a liquid mass situated between the cover or head of the first cylinder and the closed upper end of the first hollow piston rod.

2. A hydraulic damping device comprising a first vertical cylinder, a piston movable in the said first cylinder, a first hollow rod rigid with the said piston having its free end closed and forming a second cylinder, a cover or head for the first cylinder, a second hollow rod secured to the said cover or head, a diaphragm rigid with the said hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said last named orifice, a restricted orifice having a constant sectional area and formed in the said diaphragm and establishing communication between the two chambers on both sides of said diaphragm, an orifice of large cross-sectional area formed in the said diaphragm and establishing communication between the chambers on both sides of the diaphragm, a valve opening in one direction only relative to the orifice of large cross-sectional area, a liquid mass situated between the cover or head of the first cylinder, and the closed upper end of the hollow piston rod and a compressed air cushion above the liquid mass.

3. A hydraulic damping device comprising a first vertical cylinder, a piston movable in the said first cylinder, a first hollow rod rigid with the said piston having its free end closed and forming a second cylinder, a cover or head for the first cylinder, a second hollow rod secured to the said cover or head, a diaphragm rigid with the said hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said last named orifice, a restricted orifice having a constant sectional area and formed in the said diaphragm and establishing communication between the two chambers on both sides of said diaphragm, an orifice of large cross-sectional area formed in the said diaphragm and establishing communication between the chambers on both sides of the diaphragm, a valve opening in one direction only relative to the orifice of large cross-sectional area, a liquid mass situated between the cover or head of the first cylinder and the closed end of the first hollow rod, longitudinal grooves being formed on the periphery of the first hollow rod to permit a circulation of the liquid in a very restricted sectional area between the variable chambers situated on both sides of the piston.

4. A hydraulic damping device comprising a first vertical cylinder, a piston movable in the said first cylinder, a first hollow rod rigid with the said piston and forming a second cylinder, a cover or head for the first cylinder, a second hollow rod secured to the said cover or head, a diaphragm rigid with the said hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said orifice, a restricted orifice having a constant sectional area and formed in the said diaphragm and establishing communication between the two chambers on both sides of said diaphragm, an orifice of large cross-sectional area formed in the said diaphragm and establishing communication between the chambers on both sides of the diaphragm, a valve opening in one direction only relative to the wide orifice, a liquid mass bearing on the cover or head of the first cylinder and rising above the diaphragm.

5. A hydraulic damping device comprising a first vertical cylinder, a piston movable in the said first cylinder, a first hollow rod rigid with the said piston and forming a second cylinder, a cover or head for the first cylinder, a second hollow rod secured to the said cover or head, a diaphragm rigid with the said hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said last named orifice, a restricted orifice having a constant sectional area and formed in the said diaphragm and establishing communication between the two chambers on both sides of said diaphragm, an orifice of large cross-sectional area formed in the said diaphragm and establishing communication between the chambers on both sides of the diaphragm, a valve opening in one direction only relative to the orifice of large cross-sectional area, a liquid mass bearing on the cover or head of the first cylinder and rising above the diaphragm, and a compressed air cushion above the liquid mass.

6. A hydraulic damping device comprising a first vertical cylinder, a piston movable in the said first cylinder, a first hollow rod rigid with the said piston and forming a second cylinder, a cover or head for the first cylinder, a second hollow rod secured to the said cover or head, a diaphragm rigid with the said hollow rod and having a snug sliding fit in the second cylinder, a conduit formed in the cover or head of the first cylinder and freely communicating with the inner passage of the second hollow rod, a restricted orifice for establishing communication between the said conduit and the inner chamber of the first cylinder, an orifice having a large sectional area for establishing communication between the said conduit and the inner chamber of the first cylinder, a valve opening in one direction only relative to the said last-named orifice, a restricted orifice having a constant sectional area and formed in the said diaphragm and establishing communication between the two chambers on both sides of said diaphragm, an orifice of large cross-sectional area formed in the said diaphragm and establishing communication between the chambers on both sides of the diaphragm, a valve opening in one direction only relative to the orifice of large cross-sectional area, a liquid mass bearing on the cover or head of the first cylinder and rising above the diaphragm, longitudinal grooves being formed on the periphery of the first hollow rod to permit a circulation of the liquid in a very restricted sectional area between the variable chambers situated on both sides of the piston.

7. A hydropneumatic device capable of operating as damping device in two opposed directions and in which the liquid always acts under compression, comprising the combination of two chambers of variable capacity each including at least one transverse wall, at least one axially movable piston member operating with respect to the chambers, each transverse wall provided with two series of openings, the openings of one series being constantly open and having a constant and restricted cross section adapted to exert the damping and checking action on the liquid and the openings of the other series being provided with members permitting the circulation of the liquid in one direction only but then ensuring the rapid and free filling up of these chambers alternately, a liquid tank communicating constantly with these two chambers, a cushion of compressed gas such as compressed air maintained within the tank under a predetermined initial pressure.

RENÉ LUCIEN LEVY.